Jan. 14, 1930.                S. WILTSE                 1,743,585
                                GASKET
                          Filed Aug. 5, 1927

Inventor
Sumner Wiltse
By   J King Harness
                Attorney

Patented Jan. 14, 1930

1,743,585

UNITED STATES PATENT OFFICE

SUMNER WILTSE, OF DETROIT, MICHIGAN, ASSIGNOR TO WILTSE APPLIANCE CO., A CORPORATION OF MICHIGAN

GASKET

Application filed August 5, 1927. Serial No. 210,778.

This invention relates to gaskets and particularly to a type thereof that will continue to provide a tight joint upon repeated removals and insertions of the same.

One of the objects of the present invention is to provide a gasket that will also serve as a suitable thrust bearing for a rotating element.

A further object is to provide a fibre gasket having openings therein for the passage of fluid therethrough, said gasket being formed to provide a seat for a valve element controlling the flow of fluid through such opening.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several views,—

Figure 1:
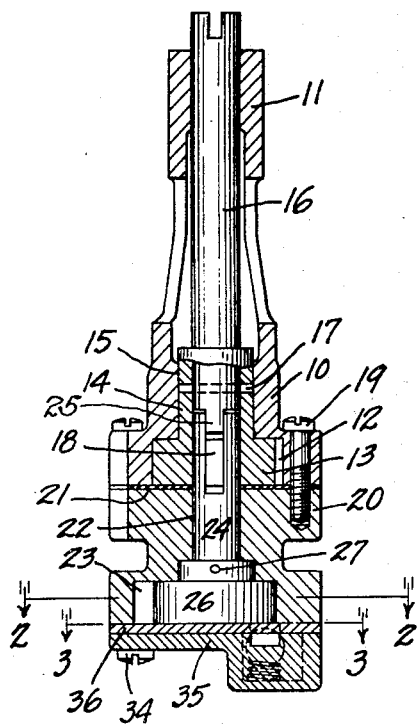
Fig. 1 is a vertical sectional view taken centrally through a combined fuel and oil pump.
Figure 2:
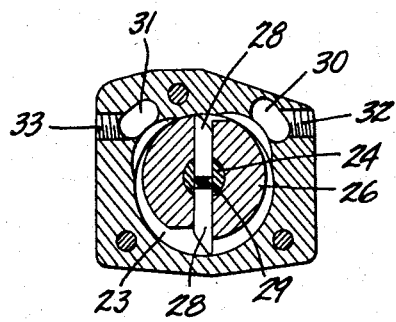
Fig. 2 is a sectional view taken on the line 2—2 of Fig. 1.
Figure 3:
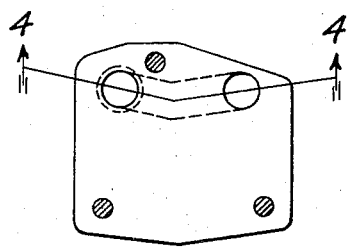
Fig. 3 is a sectional view taken on the line 3—3 of Fig. 1.
Figure 4:
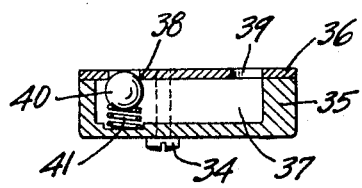
Fig. 4 is a vertical sectional view taken on the line 4—4 of Fig. 3.

As an illustration of the present invention, I show the same in the accompanying drawing in connection with a combined oil and fuel pump. This pump comprises a casing, the main body portion of which is indicated by the numeral 10. The casing 10 is provided with an upwardly extending part 11 serving as a guiding and supporting means for the pump. The casing 10 is also provided with a circular chamber 12 opening on the lower face of the same and in which is located a rotor 13 provided with a hub portion 14 which is received in the opening 15 in the casing eccentrically of the chamber 12. The central drive shaft 16 which is rotatably received in the upper portion 11 of the housing is received in the hub portion 14 of the rotor 13 and is secured thereto for equal rotation therewith by the pin 17. A pair of diametrically outwardly spring pressed vanes are slidably received in the rotor 13 and cooperate with the walls of the chamber 12 to cause a flow of the fluid through the pump. Suitable inlet and outlet ports (not shown) to the chamber 12 are provided for the introduction of oil to and the passage of oil from the chamber 12. Secured to the lower face of the housing 10 by a plurality of screws 19 is a second casing 20, a fibre gasket 21 being interposed between in contacting faces. The housing 20 is provided with a central opening 22 and a chamber 23 opening on the lower face thereof, the opening 22 being in alignment with the shaft 16. Within the opening 22 is received the shaft 24, the upper slotted end of which projects up through the rotor 13 on either side of the vanes 18 and embraces the tongue 25 formed on the lower end of the shaft 16 in order to removably secure the shaft 24 to the shaft 16 for equal rotation therewith. A rotor 26 within the chamber 23 is secured to the shaft 24 by the pin 27, the rotor 26 being positioned eccentrically of the chamber 23 in the same manner that the rotor 13 is positioned with respect to the chamber 12. A pair of slidably diametrically positioned vanes 28 are carried by the rotor 26 and are constantly urged outwardly into contact with the walls of the chamber 23 by means of the coil spring 29. Suitable inlet and outlet ports 30 and 31 respectively are provided for the chamber 23, the inlet port 30 being connected with the exterior of the casing 20 by means of the threaded passage 32 and the outlet port 31 being similarly connected with the exterior of the casing 20 by the threaded passage 33. Secured to the lower open face of the casing 20 by the screws 34 is the cap 35, a gasket 36 being positioned between the opposed faces of the cap 35 and casing 20. The gasket 36, in accordance with the present invention, is formed of fibre of substantial thickness. The cap 35 is provided with a duct 37 leading from below the outlet port 31 to below the inlet port 30, openings 38 and 39 being provided in the gasket 36 for connecting the ports 30 and 31 to the duct 37. A ball 40 positioned within the duct 37 is constantly urged by the coil spring 41 into contact with the lower beveled edge of the opening 38 in order to provide a check valve for the same which permits fuel in the chamber 23 to be passed through the duct 37 from the outlet port 31 to the inlet port 30 when the pressure of the fuel within the outlet passage has reached a predetermined value. The gasket 36 not only serves as a gasket, an end thrust bearing for the rotor 26, a passage for fuel from the chamber 23 to the duct 37, and as a dividing wall between the duct 37 and the chamber 23, but also serves as a seat for the the check ball 40.

I form this gasket 36 from fibre and I have found that the same preserves a tight joint between the casing 20 and cap 35 after repeated disassembling and reassembling of the pump mechanism. It also serves as an ideal thrust bearing for the rotor 26 with a minimum of wear and frictional resistance and is ideally suited as a seat for the ball 40, showing a minimum of wear and maintaining a perfect seat for the same at all times.

In practice, before assembling the gasket 36 to the rest of the mechanism, I prefer to soak the same for a few minutes in hot water, thus softening the surface and insuring a perfect and non-leaking joint between the cap and the casing 20 after they are assembled together.

Figure 5:
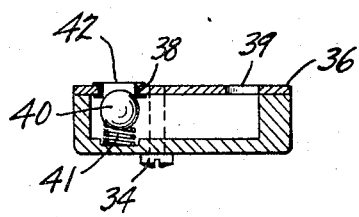
Fig. 5 is a vertical sectional view taken on the line 4—4 of Fig. 3, illustrating a modified form of gasket made in accordance with the present invention.
Figure 6:
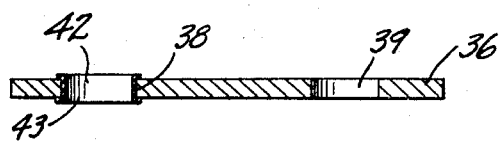
Fig. 6 is an enlarged vertical sectional view of the gasket shown in Fig. 5 and taken on the same line as the section shown in Fig. 5.

In Figs. 5 and 6 I show a slight modification of the gasket 36. In this case I provide a metal ferrule 42 in the opening 38 and preferably bevel the lower edge thereof as at 43 to provide a seat in the ball 40. This insures a longer lived and more perfect seat for the ball 40.

Although I have shown the present invention in connection with a particular type of pumping apparatus, it will be apparent that my invention is not limited to this specific use shown, but is particularly adaptable in any construction where a gasket may be employed for serving the dual functioning of a gasket and a valve seat, or the plurality of functions of a gasket, valve seat and a thrust bearing.

Formal changes may be made in the specific embodiment of the invention described without departing from the spirit or substance of the broad invention, the scope of which is commensurate with the appended claims.

What I claim is:

1. In combination, a casing provided with an open end, a pumping element within said casing, a cap closing said open end and formed to provide a duct between the inlet and outlet ports for said element, a sheet of fibre between said casing and said cap, an opening in said sheet connecting said duct with said ports, and a valve element cooperating with one of said openings, said fibre formed to provide a seat for said valve element.

2. In combination, a pump casing provided with an open end, a cap for said end, a fibre gasket between said casing and said cap, a duct in said cap, openings in said gasket connecting said duct with the interior of said casing, and a spring pressed ball cooperating with one of said openings to control the flow of fluid through said duct.

3. In combination, a pump casing, a cap for closing one end of said casing, a duct in said cap, a fibre gasket between said cap and said casing, openings in said gasket connecting said duct with the interior of said casing, a metal ferrule in one of said openings, and a spring pressed member cooperating with said ferrule for controlling the flow of fluid from said casing through said duct.

4. In combination, a pump casing provided with an open end, a rotor within said casing, a cap for said open end, a duct in said cap, a sheet of fibre between said cap and casing forming a thrust bearing for said rotor, openings in said fibre connecting said housing with said duct, a spring pressed member for controlling the flow of fluid through one of said openings, and a metal ferrule in the last mentioned opening forming a seat for said member.

5. In combination, a pump casing provided with a chamber in one end thereof, a rotatable pump element in said chamber, inlet and outlet ports for said chamber in said casing, a cap for said chamber, a groove in said cap extending between said ports, a fibre gasket between said casing and said cap forming a wall for said groove, a wall for said chamber and a thrust member for said rotor, openings in said gasket connecting said ports with said groove, and a spring pressed ball cooperating with one of said openings for controlling the pressure within said chamber.

SUMNER WILTSE.